United States Patent [19]

Hendrickson et al.

[11] Patent Number: 5,107,369
[45] Date of Patent: Apr. 21, 1992

[54] WIDE FIELD MULTI-MODE TELESCOPE

[75] Inventors: Daniel L. Hendrickson, Coronado; Brian W. Neff, Leucadia; Murray R. Dunn, Carlsbad, all of Calif.

[73] Assignee: Thermo Electron Technologies Corp., San Diego, Calif.

[21] Appl. No.: 619,861

[22] Filed: Nov. 28, 1990

[51] Int. Cl.[5] ............... G02B 17/06; G02B 17/08; G02B 26/10

[52] U.S. Cl. .................. 359/399; 359/364; 359/223; 359/220; 250/203.1

[58] Field of Search .............. 350/537, 503–505, 350/619, 620, 622, 486, 1.1, 1.2, 6.5, 6.9, 6.91; 250/203 R, 216; 455/619

[56] References Cited

U.S. PATENT DOCUMENTS

| | | | |
|---|---|---|---|
| 3,443,853 | 5/1969 | Todd | 350/504 |
| 4,025,783 | 5/1977 | Fletcher et al. | 350/504 |
| 4,101,195 | 7/1978 | Korsch | 350/505 |
| 4,395,095 | 7/1983 | Horton | 350/505 |
| 4,521,068 | 6/1985 | Schulte in den Bäumen | 350/505 |
| 4,883,348 | 11/1989 | Spivey et al. | 350/503 |

Primary Examiner—Bruce Y. Arnold
Assistant Examiner—James Phan
Attorney, Agent, or Firm—John R. Ross

[57] ABSTRACT

A telescope with a spherical primary mirror and movable lightweight secondary assembly which includes an optical, imaging component and at least one location component both of which components are attached to a pivot arm. The location component can be a microwave, radio frequency or acoustic location component. The optical component of this secondary assembly reflects a portion of focused light radiation from the primary mirror back to the primary mirror and thence through a hole in the secondary mirror to a coude' optics device at the center of curvature of the primary mirror. The coude' optics device in turn reflects the focused light radiation to an imaging detector housed in the outer structure of the telescope. A preferred embodiment of the present invention combines all three of these location systems with the optical imaging component.

16 Claims, 11 Drawing Sheets

WIDE FIELD MULTI-MODE TELESCOPE

The invention relates to the field of telescope instruments and more particularly it relates to fast scanning optical and microwave telescopic systems.

BACKGROUND OF THE INVENTION

Classical optical telescopes have very limited fields-of-view, typically <1° and at most 5°. Scanning rates for current high magnification telescope designs are typically very slow. A need exists for a high magnification telescope capable of very rapidly scanning a wide field of regard locating targets in that field of regard and examining in detail many objects of interest in that field. Prior art methods of rapid scanning include the use of a conventional telescope and s canning mirror larger than the aperture of the telescope. The mirror is positioned to reflect radiation from targets within the target range into the aperture of the telescope. Such mirrors are relatively heavy, making rapid scanning (including stopping and starting) difficult. U.S. Pat. No. 4,883,348 disclosed a wide field optical system capable of very rapid optical scanning. Similarly, the need exists for telescopes in which optical energy, microwave, radio waves and acoustic energy can be received and microwave and laser signals can be transmitted with the same aperture and a rapid scanning mechanism.

SUMMARY OF THE INVENTION

The present invention provides a telescope with a spherical primary mirror and movable lightweight secondary assembly which includes an optical, imaging component and at least one location component both of which components are attached to a pivot arm. The location component can be a microwave, radio frequency or acoustic location component. The optical component of this secondary assembly reflects a portion of focused light radiation from the primary mirror back to the primary mirror and thence through a hole in the secondary mirror to a coude' optics device at the center of curvature of the primary mirror. The coude' optics device in turn reflects the focused light radiation to an imaging detector housed in the outer structure of the telescope. A preferred embodiment of the present invention combines all three of these location systems with the optical imaging component.

DETAILED DESCRIPTION OF THE PREFERRED EMBODIMENTS

Figure 1:
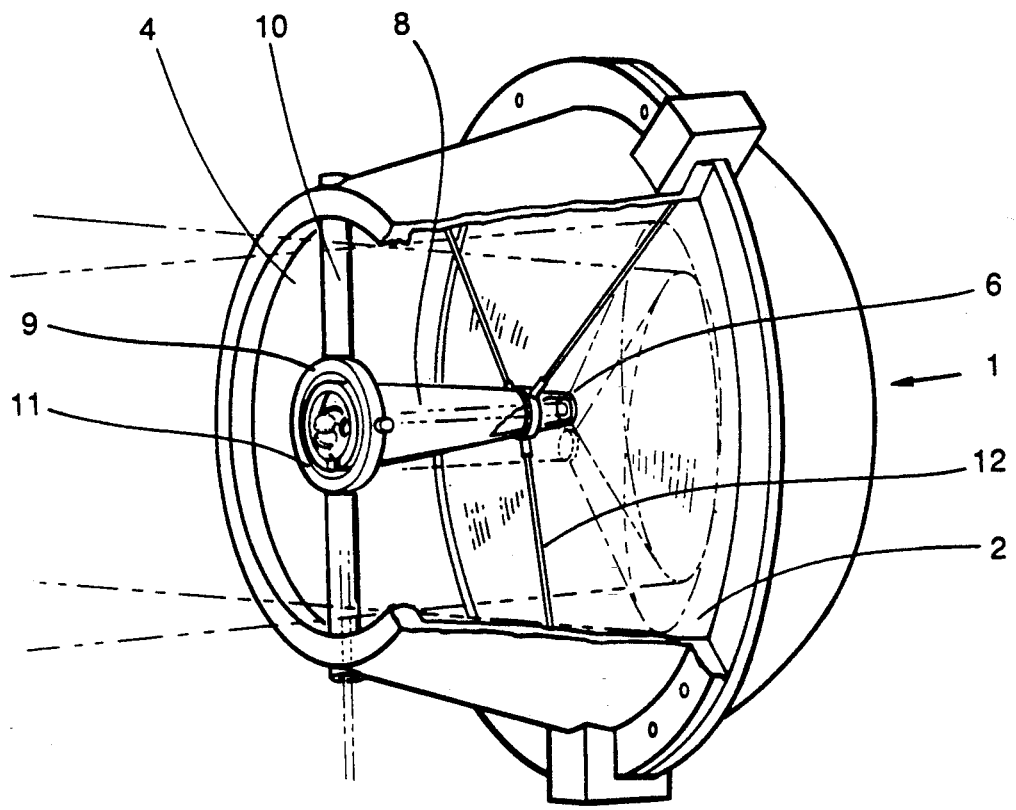
FIG. 1 is a sketch of a preferred embodiment of the invention as an optical system.
Figure 2:
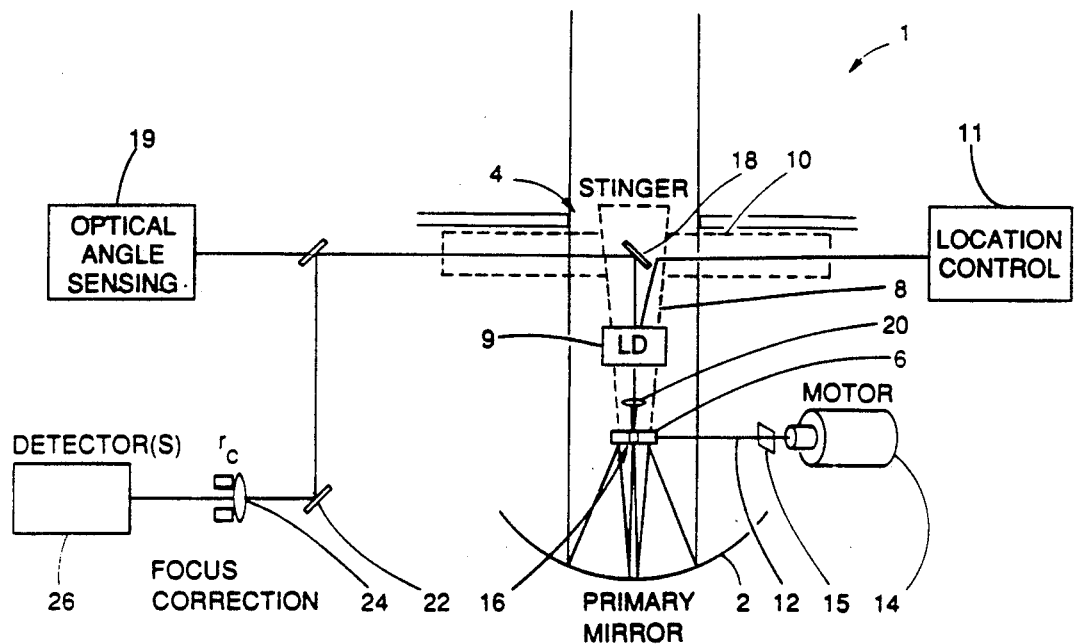
FIG. 2 is a diagramatic representation of a preferred embodiment of the invention.

Preferred embodiments of the optical part of the system of the present invention are illustrated in FIGS. 1 through 7. The key elements are as shown in FIGS. 1 and 2. A 1-meter diameter spherical primary mirror 2 has a 0.5 meter diameter circular aperture stop 4 centered at the center of curvature of the mirror.

This embodiment incorporates a positive reflecting secondary mirror 6 located at one end of a lightweight pivot arm which we call a stinger 8. An inner gimbal 9 is attached at the other end of stinger 8. An outer gimbal 11 is attached to a brace assembly 10 so as to permit the stinger 8 to pivot about the center of curvature of primary mirror 2. Cables 12 are attached to a cable attachment block 13 on the stinger 8 near the secondary mirror 6. These cables 12 are controlled by motors 14 and capstan assemblies 15 so as to control the movement of the secondary mirror 6 along a surface which is near the surface defined by the paraxial focus of the primary mirror 2. The concave secondary mirror 6 is located near the paraxial focus surface. The secondary mirror 6 preferably is an oblate spheroid with higher aspheric terms to balance the spherical aberration inherent in a low F# spherical primary mirror 2.

Figure 3:
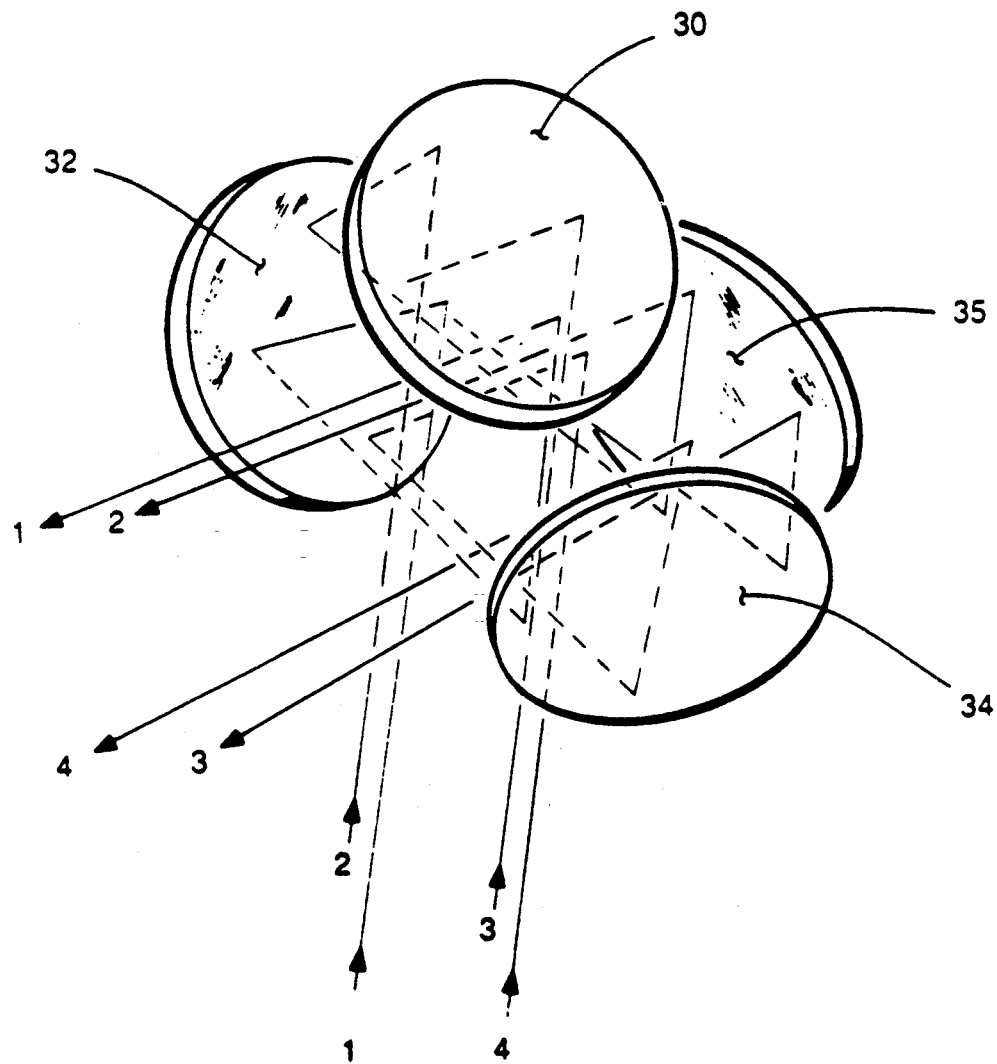
FIG. 3 is a sketch showing a coude' optics arrangement.

Light rays passing through the aperture 4 in the plane of the brace assembly 10 reflect off the primary mirror 2, then reflect off the secondary mirror 6, back to the primary mirror 2, then back through hole 16 in the center of the secondary mirror 6, and reflect through a coude' optics arrangement 18 at the center of curvatures. To reduce the diameter of the beam passing through the coude' path, either a collimating lens 20 (or an all reflective optics assembly shown in detail in FIG. 5) is located at an appropriate position along the optical axis of the secondary mirror 6. The coude' arrangement 18 relays the beam out of the stinger 8 to an optical path within the telescope structure 1. The coude' optics arrangement is in the preferred embodiment is a set of four mirrors as shown in FIG. 3. In this arrangement mirrors 30 and 32 move with inner gimbal 9 and mirrors 34 and 35 move with outer gimbal 11. Mirrors 32 and 34 are located on the pivot axis of the inner gimbal 9 and mirror 35 is located on the pivot axis of the outer gimbal 11.

In the outer structure 1 of the telescope the optical beam is reflected from the coude' optics arrangement 18 to a fast steering mirror 22 and is focused by lens 24 on to a detector 26. Thus, gross scanning is accomplished by movement of the stinger 8 and fine scanning is accomplished by movement of fast steering mirror 22. This arrangement permits extremely fast and accurate scanning as well as compensation for telescope vibrations with the fast steering mirror 22.

Figure 4:
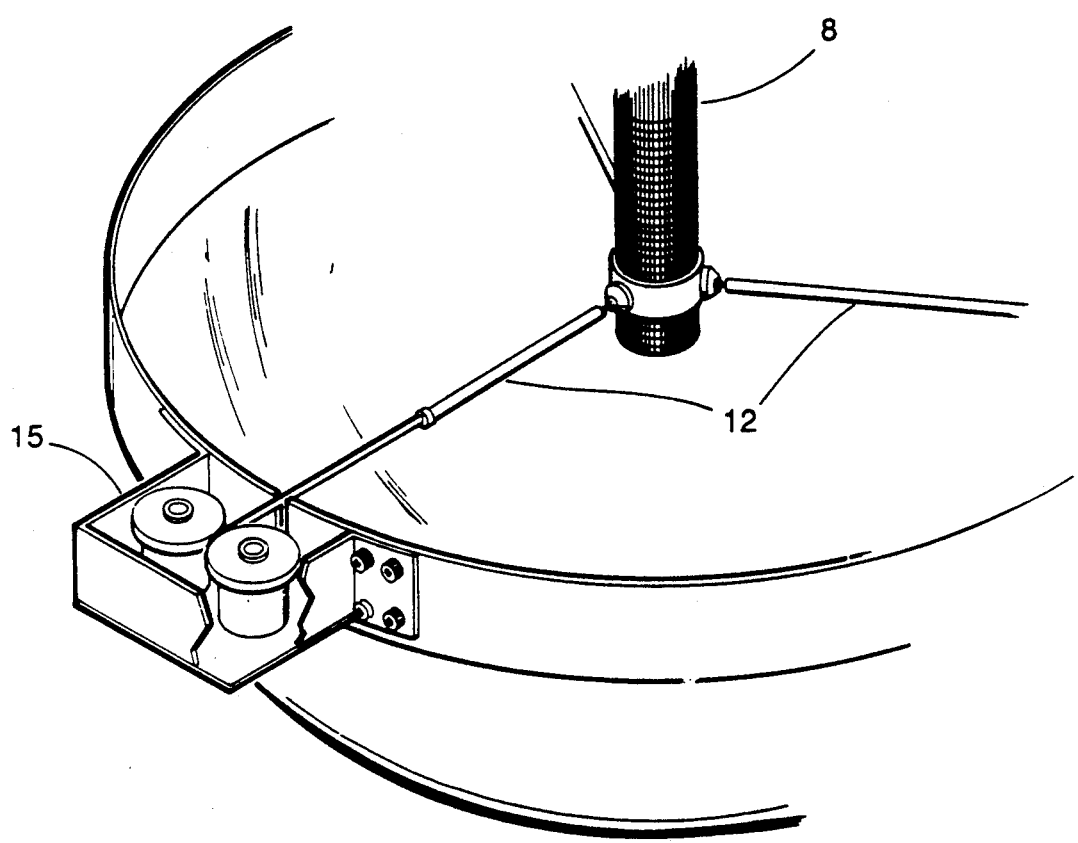
FIG. 4 is a sketch showing the operation of a positioning means for a preferred embodiment of the invention using four motors.
Figure 5:
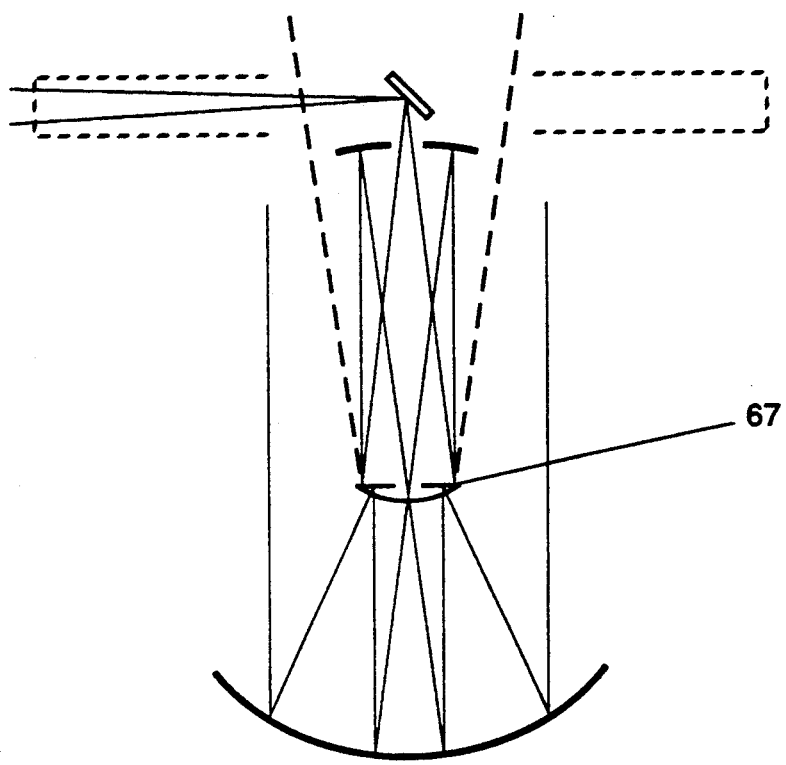
FIG. 5 is a sketch showing all reflective optics for collimation of the optical beams in the stinger.

In the FIG. 2 preferred embodiment for optical telescope, the concave secondary mirror 6 can be rapidly positioned at any location along a surface about 2 cm behind the focal surface of the primary mirror. The major components of the positioning system are shown in FIG. 4. They include the stinger 8, the cable block 12, the drive cables 13, motors 14, and capstan assemblies 15.

A positioning system positions the stinger 8 and the attached secondary mirror 6 to provide the correct pointing angle. It does this by generating the drive signals for the stinger drive motors 14 in response to feedback primarily from motor position sensors and an angle sensing interferometer 19.

The control of the drive motors 14 is preferably performed with a computer system which may be easily constructed and programmed by persons skilled in that art. Such computer systems provide extremely fast positioning of the secondary mirror 6 and much faster positioning of the fast steering mirror 22.

Figure 6:
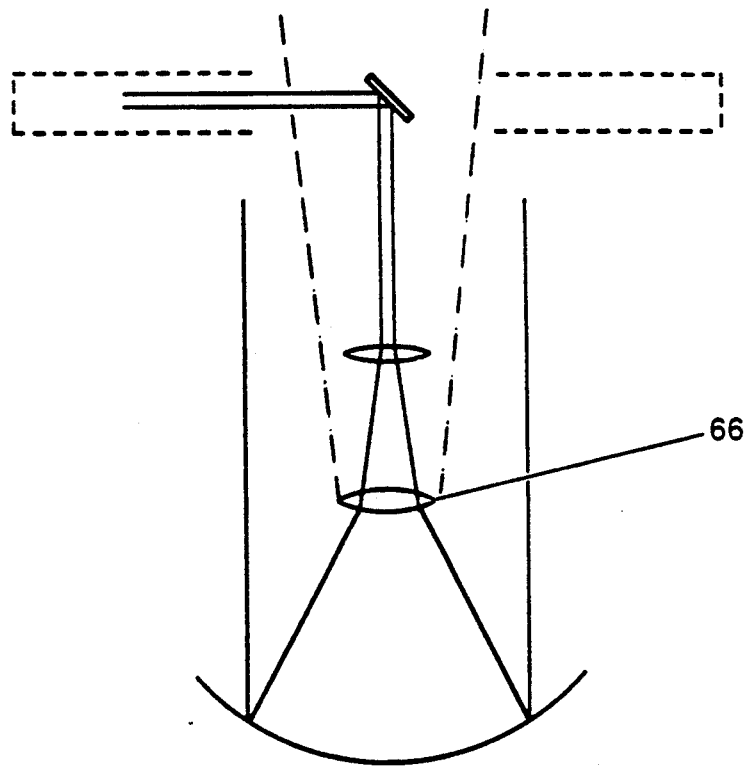
FIG. 6 is a sketch showing a lens as secondary optical means.
Figure 7:
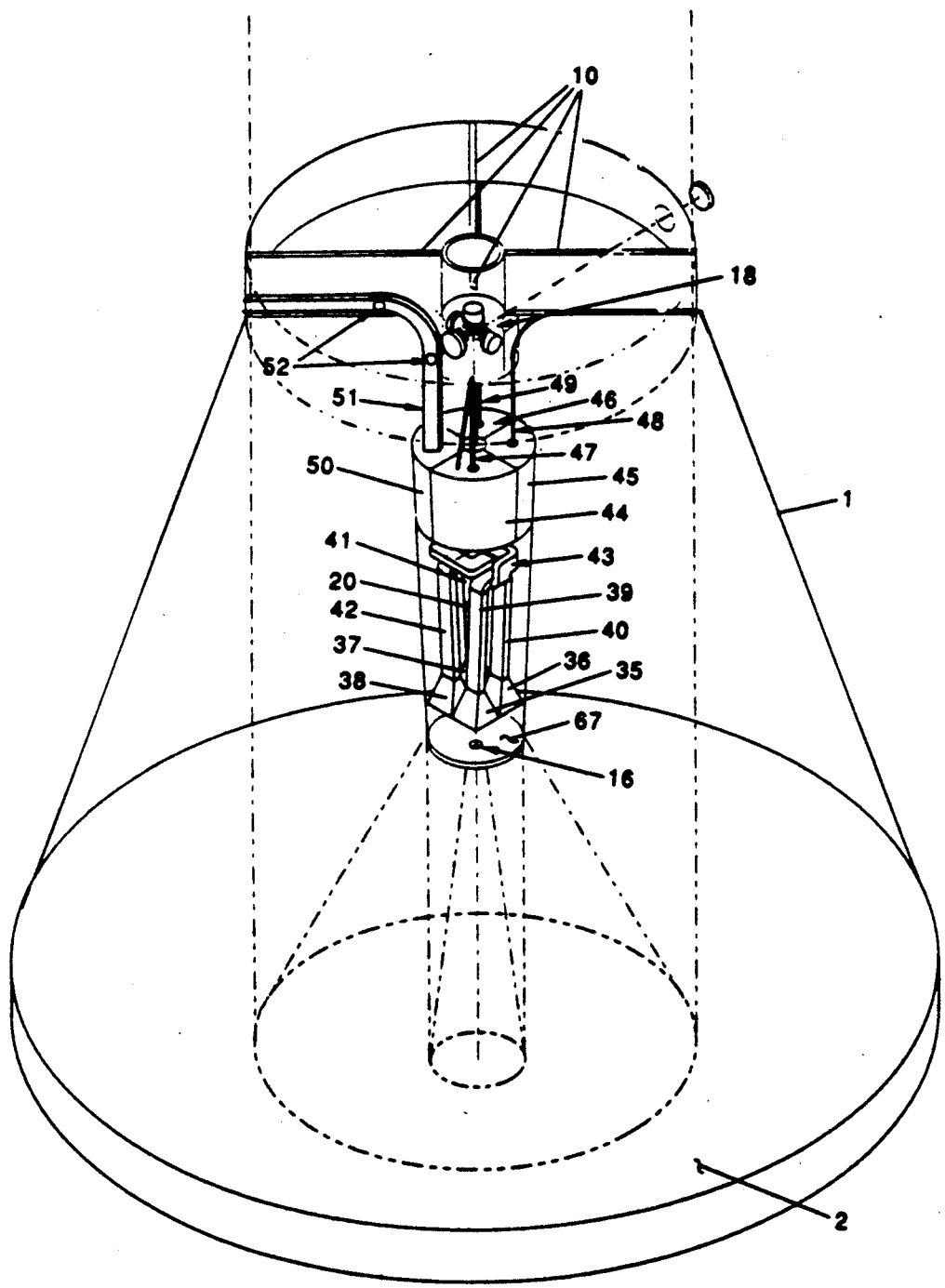
FIG. 7 is a sketch showing a diagramatic representation of a preferred embodiment of the invention as a dual mode monopulse RADAR microwave and LIDAR beam director.

It should be stated that the secondary mirror 6 could be replaced with a lens 66 as indicated in FIG. 6 without substantial change in the nature of the telescope. In this case the rays reflecting off the primary mirror 2 merely pass through the lens 66 to the coude' optics arrangement 18. Also, the four mirror coude' arrangement shown in FIG. 3 could be replaced by a mirror operated on half-angle gears.

As shown in FIG. 2 a location device 9 is positioned on stinger 8 along with the secondary optical components. This location device can be any device or devices for discriminating and sensing the direction of a potential target in or near the field of view of the optical component. In this preferred embodiment we utilize three such devices; a microwave position detector, an acoustic position detector and a radio frequency position detector.

Figure 8:
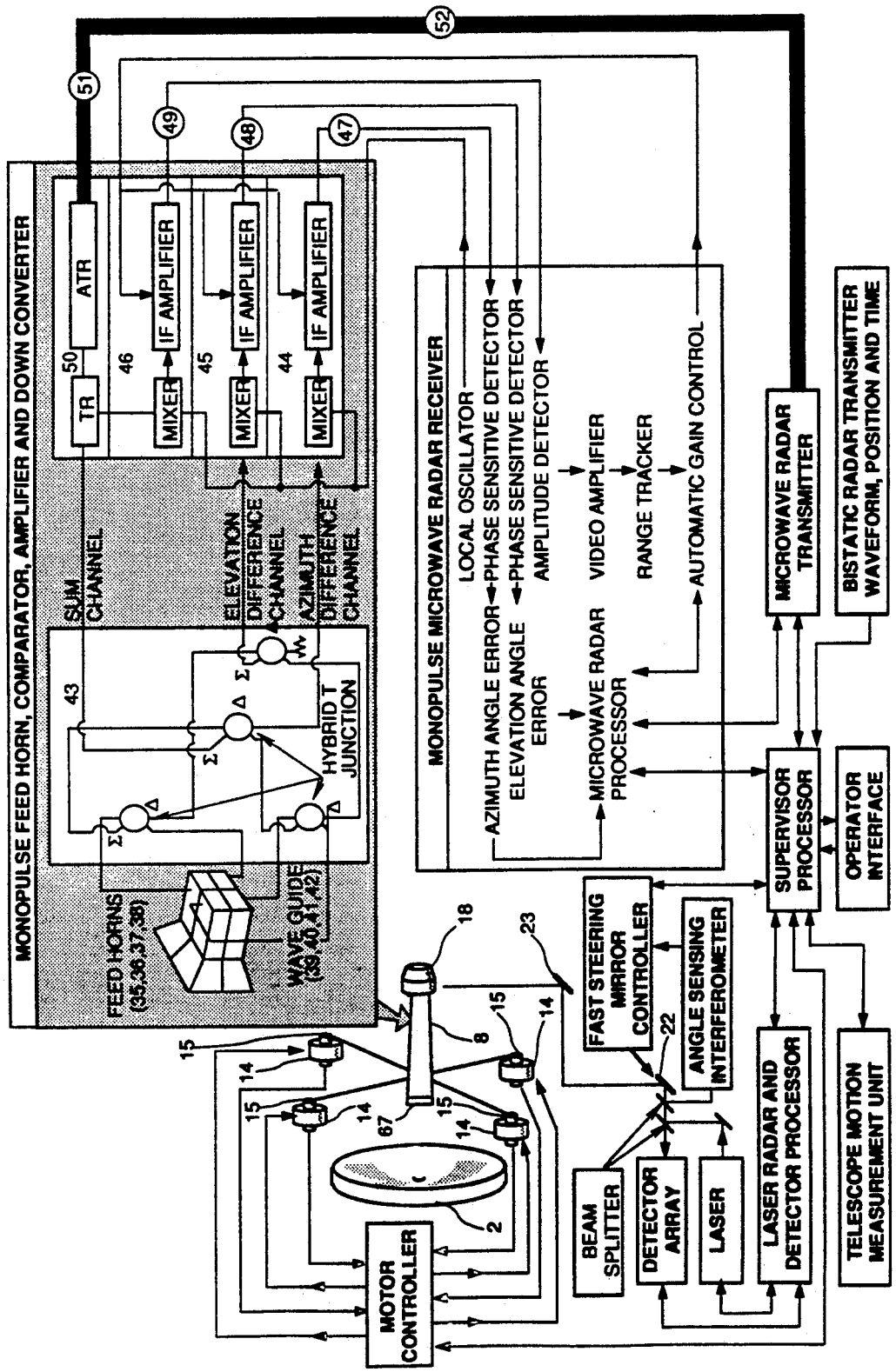
FIG. 8 is a block diagram of the dual mode monopulse microwave RADAR and LIDAR beam director.

In our preferred embodiment shown in FIG. 8 both optical and microwave energy is transmitted toward the target. Secondary mirror 67 is constructed of silicon, and is coated with multilayered dielectric material such as magnesium fluoride which is highly reflective in optical frequencies. Silicon and magnesium fluoride are transparent to microwave energy in the frequencies of interest. Microwave energy is reflected from the primary mirror through the secondary mirror into four feed horns 35, 36, 37 & 38 located behind the secondary mirror 67. In this configuration, the secondary mirror 67 is approximately 7 cm diameter with a 1.5 cm hole 16 in its center. A smaller 0.5 cm hole 68 for transmitting optical energy is located at the juncture of the four microwave feed horns which is along the center line (optical) axis of the stinger 8. The four microwave feed horns 35, 36, 37 & 38 in turn conduct the microwave energy through four waveguides 39, 40, 41, & 42 to a microwave monopulse antenna feed comparator 43 shown in FIG. 7, which converts the microwave signals received from the feed horns to an output of three amplitudes and two frequency differences. These three outputs are in turn amplified, filtered, and downconverted by three downconverter modules 44, 45, & 46 and are fed into three coaxial cables 47, 48 & 49, which are in turn passed through to the telescope structure 1 through three braces in the brace structure 10. The three coaxial cables 47, 48 & 49 are in turn routed to a monopulse signal processor which facilitates the centroiding of received microwave energy by generating steering toward null commands for control of the movement of the stinger 8. When the stinger 8 is positioned so as to produce a null point, turnover of target tracking to passive optical means an/or active optical LIDAR can be readily accomplished even through the instantaneous field of view of the optical system may be only a few milliradians. After turnover of target track to the optical system the monopulse system can be used to track subsequent targets which can be displaced several hundreds of milliradians from the stinger 8 axis which used optical means to control the secondary mirror 67 in tracking a target by the optical system.

Figure 9:
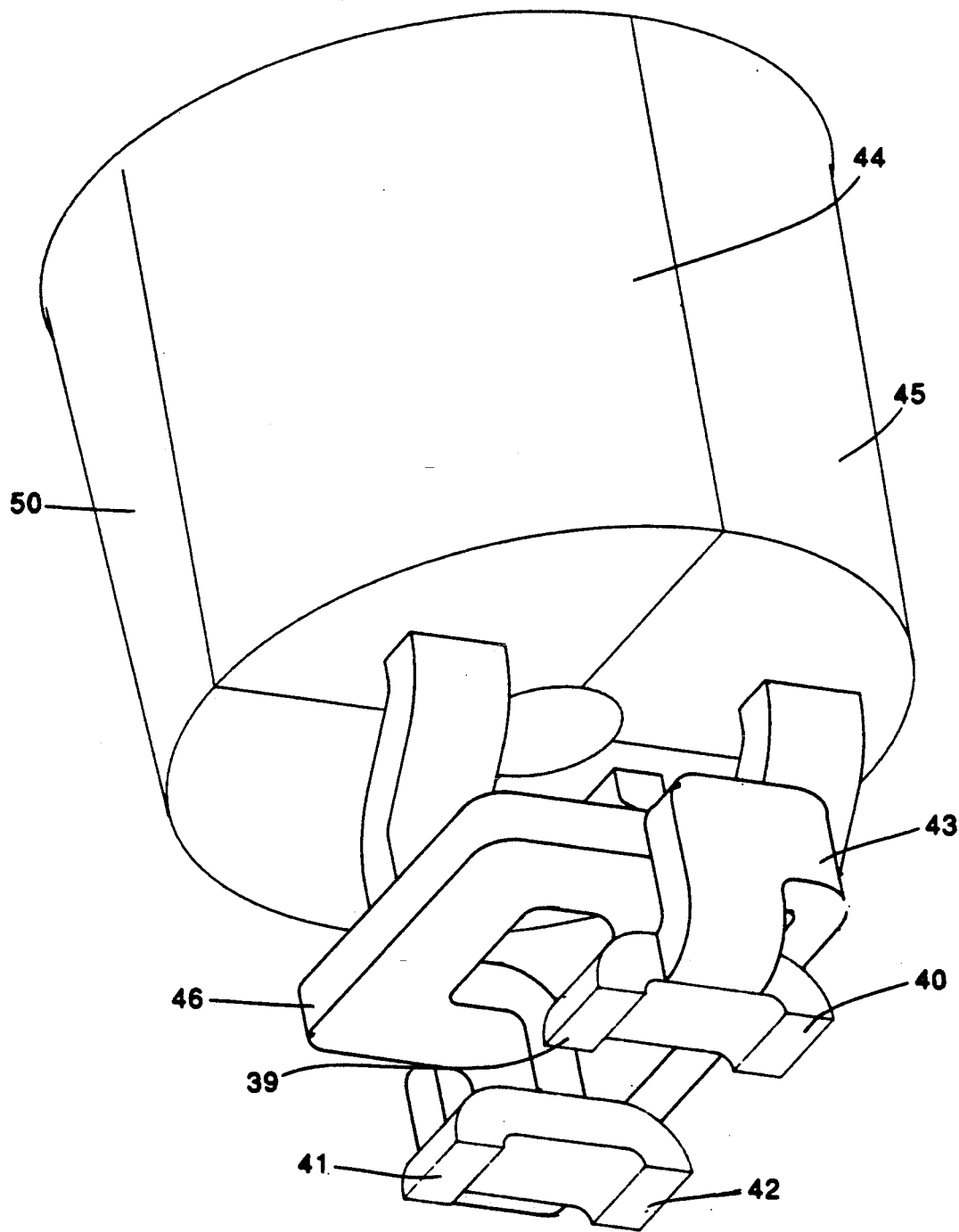
FIG. 9 is a sketch showing a novel microwave monopulse microwave comparator design which permits an optical path down its center axis.

The addition of a microwave transmit/receive switching module 50 to the downconverter assembly which sums all four received signals 44 and connection with a microwave source through a waveguide 51 equipped with flexible couplings 52 designed to permit movement of the stinger 8 over the field-of-regard permits routing of microwave transmit pulses from the telescope structure 1 through the brace assembly 10 to the switching module 50 allows the FIG. 8 embodiment of this telescope to be operated simultaneously as a dual mode monostatic microwave RADAR and optical LIDAR beam director, which by virtue of its lightweight roving fovea stinger 8, permits rapid, near simultaneous tracking of both microwave and optical signals over a wide field of regard. FIG. 9 presents a block diagram of the monopulse RADAR and LIDAR embodiment shown in FIG. 8.

Figure 10:
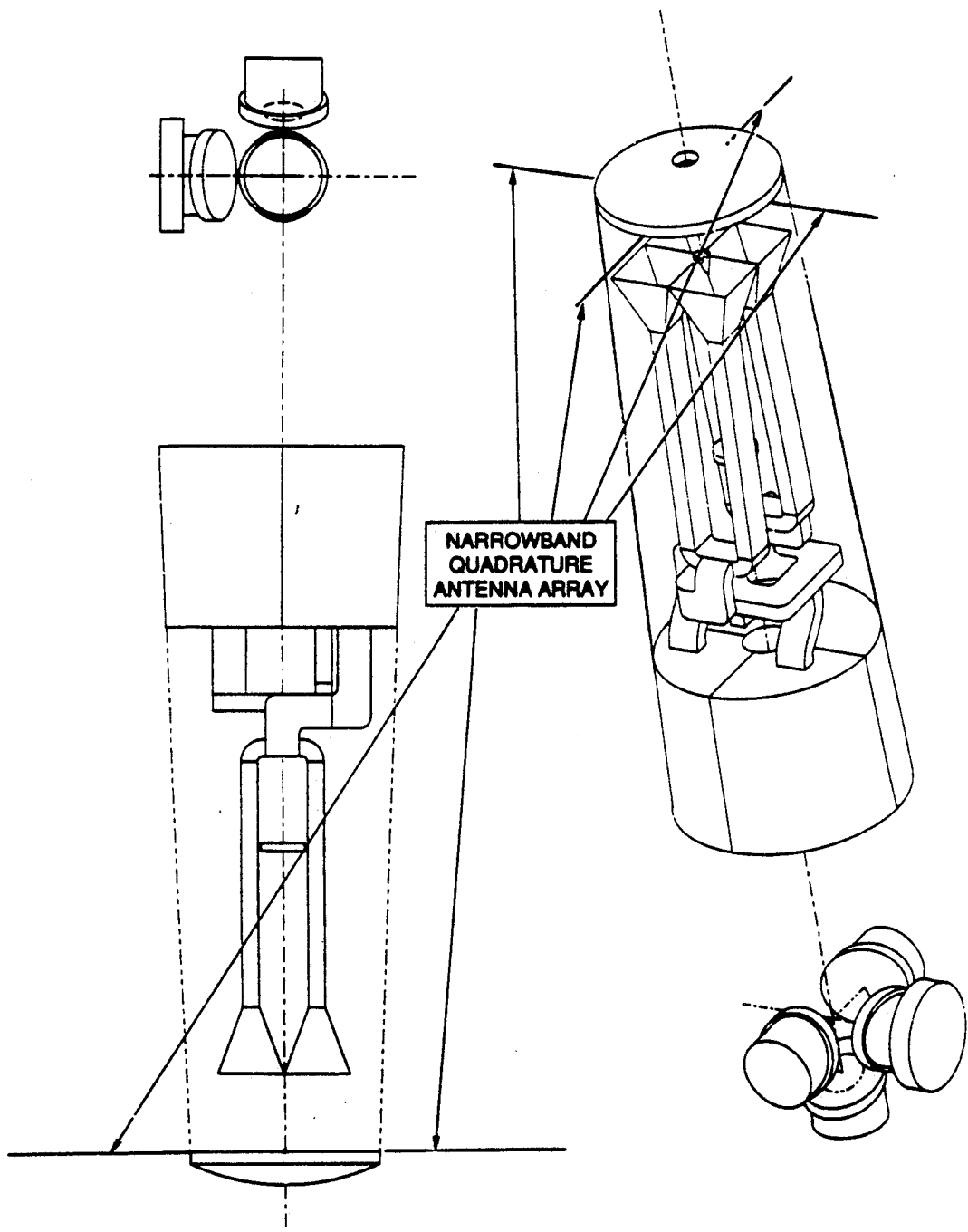
FIG. 10 is a sketch of a ratio frequency detector employing a narrow bandwidth quadrature detector array.
Figure 11:
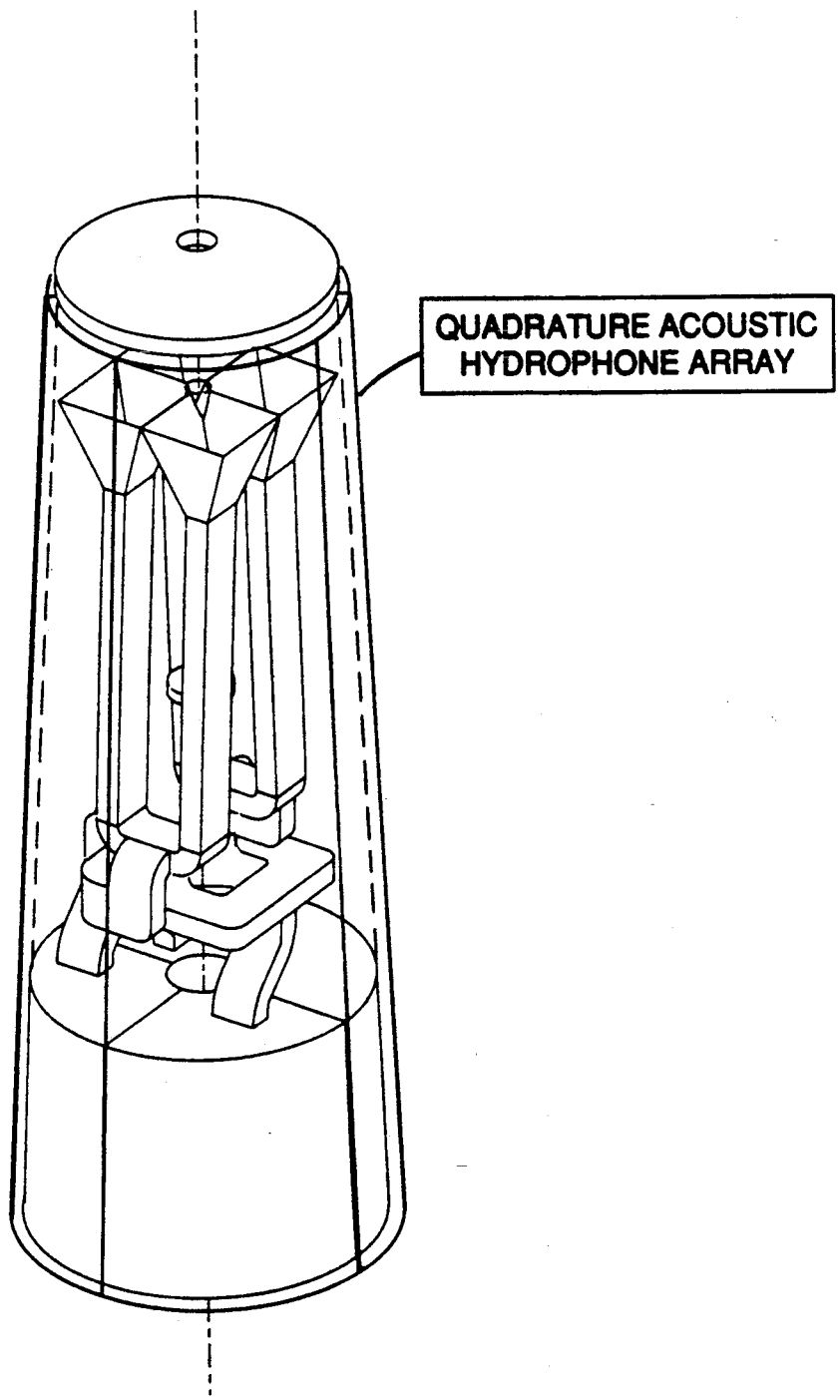
FIG. 11 is a sketch of an acoustic detector employing four acoustic receive hydrophones as a quadrature detector array.

The addition of a narrowband radio frequency quadrature antenna array and detector, as shown in FIG. 10, and/or a quadrature acoustic hydrophone array and detector, as shown in FIG. 11, allows the preferred embodiments of the telescope shown in FIG. 1 and 8 to employ the movement of the stinger to centroid on radio frequency and/or acoustic signals as an aid to further detection and tracking of higher frequency microwave and/or optical energy which may be emitted by targets of interest. These embodiments can also detect monostatic and bistatic RADAR and/or LIDAR energy reflected from these targets. Embodiments of this invention may also communicate with targets being tracked using microwave and/or laser energy or to jam sensors on these targets.

While the above description contains many specificities, the reader should not construe these as limitations on the scope of this invention, but merely as exemplifications of preferred embodiments thereof. Those skilled in the art will envision many other possible variations which are within its scope.

Accordingly, the reader is requested to determine the scope of the invention by the appended claims and their legal equivalents, and not by the examples which have been given.

What is claimed is:

1. A telescope system for detecting electromagnetic radiation within a viewing range comprising:
   a. an optical imaging component comprising:
   1) a spherical concave primary mirror defining a focal surface and center of curvature,
   2) a secondary optical means for directing beams of radiation reflected off said primary mirror to the vicinity of said center of curvature,
   3) a positioning means for positioning said secondary optical means at a plurality of positions near said focal surface,
   4) a detector means for detecting all or a portion of said beams of radiation, said primary mirror, said secondary optical means, said positioning means and said detector means, being arranged so that said positioning means positions said secondary optical means so as to permit said telescope system to scan said viewing range and to permit said detector means to detect all or portions of said beams of radiation within said viewing range and b. a location means for locating targets within or near the field of view of said optical imaging component.

2. The telescopic system of claim 1 and further comprising a steering means for steering said beams of radiation to said detector.

3. The telescopic system of claim 2 wherein said steering means comprises a fast steering mirror.

4. The telescopic system of claim 2 wherein said steering means comprises a movable detector.

5. The telescopic system of claim 1 wherein said positioning means comprises a pivot arm pivoted about a point on or near said center of curvature.

6. The telescopic system of claim 5 wherein said secondary optical means is a mirror having a hole at or near its center.

7. The telescopic system of claim 1 further comprising a coude' optics means located at said center of curvature for directing said beams of radiation to said detector.

8. The telescopic system of claim 2 further comprising a coude' optics means located at said center of curvature for directing said beams of radiation to said steering means.

9. The telescopic system of claim 1 further comprising an inner gimbal and an outer gimbal located so as to permit pivoting about said center of curvature.

10. The telescopic system of claim 9 further comprising a coude' optics means located at said center of curvature for directing said beams of radiation to said steering means.

11. The telescopic system of claim 10 wherein said coude' optics means comprises four mirrors, two of which are mounted on said inner gimbal and two of which are mounted on said outer gimbal.

12. A telescopic system for transmitting laser radiation to targets within a target range comprising:

a laser source means for generating a laser beam having a cross sectional area, a spherical concave primary mirror defining a focal surface and a center of curvature, a secondary optical means for expanding the cross sectional area of said laser beam so that said beam will reflect off said primary mirror as a collimated beam increased in cross sectional area, a coude' optics means located at said center of curvature for directing said laser beam to said optical means, a rapid positioning means for positioning said secondary optical means at a plurality of positions on or near said focal surface, said laser source, primary mirror, optical means, coude' optics means and positioning means being arranged to permit transmittal of said laser beam to a plurality of targets in said target range in rapid succession by changing the position of said secondary optical means but without movement of said laser source or said primary mirror, and a microwave transmitting means for transmitting microwave energy toward targets within or near the field of view of said optical imaging system.

13. A telescopic system of claim 1 wherein said location means comprises a microwave position detector.

14. A telescopic system of claim 1 wherein said location means comprises an acoustic position detector.

15. A telescopic system of claim 1 wherein said location means comprises a radio frequency position detector.

16. A telescopic system of claim 1 wherein said location means comprises a microwave position detector, an acoustic position detector and a radio position detector.

* * * * *